United States Patent [19]
Paris et al.

[11] 3,821,391
[45] June 28, 1974

[54] 1,3-DIMETHYL-4,5-DI(P-SUBSTITUTED PHENYL)6H-PYRROLO(2,3-C) PYRAZOLES IN TREATING INFLAMMATION

[75] Inventors: Gerard Yvon Paris, Duvernay, Quebec, Canada; Leo Ralph Swett, Waukegan, Ill.

[73] Assignee: Abbott Laboratories, North Chicago, Ill.

[22] Filed: Mar. 15, 1973

[21] Appl. No.: 341,443

Related U.S. Application Data

[60] Continuation-in-part of Ser. No. 257,732, May 30, 1972, abandoned, which is a division of Ser. No. 112,767, Feb. 4, 1971, Pat. No. 3,701,785.

[52] U.S. Cl. .............................................. 424/272
[51] Int. Cl. ............................................ A61k 27/00
[58] Field of Search .................................. 424/272

[56] References Cited
FOREIGN PATENTS OR APPLICATIONS
168,299  2/1965  U.S.S.R. ........................ 260/310 R

OTHER PUBLICATIONS
Chem. Abst., Vol. 62, 2339 f (1965).
Chem. Abst., Vol. 62, 16256 (1965).

*Primary Examiner*—Stanley J. Friedman
*Attorney, Agent, or Firm*—Robert L. Niblack; Joyce R. Krei; Vincent A. Mallare

[57] ABSTRACT

Novel 1,3-dimethyl-4,5-di(p-substituted phenyl)-6H-pyrrolo[2,3-c]pyrazoles and novel intermediates useful in their synthesis. The compounds are useful as anti inflammatory and anti-pyretic agents.

13 Claims, No Drawings

1,3-DIMETHYL-4,5-DI(P-SUBSTITUTED PHENYL)6H-PYRROLO(2,3-C) PYRAZOLES IN TREATING INFLAMMATION

CROSS-REFERENCE TO RELATED APPLICATIONS

This application is a continuation-in-part of co-pending application, Ser. No. 257,732, filed May 30, 1972, now abandoned, which was a divisional application of U.S. Ser. No. 112,767, filed Feb. 4, 1971, now U.S. Pat. No. 3,701,785, issued Oct. 31, 1972.

DETAILED DESCRIPTION OF THE INVENTION

This invention relates to novel 1,3-dimethyl-4,5-di(p-substituted phenyl)-6H-pyrrolo[2,3-c]pyrazoles represented by the formula

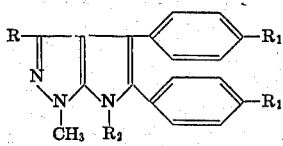

wherein R is hydrogen or methyl; $R_1$ is hydrogen, $C_1$–$C_4$ alkyl, $C_1$–$C_4$ alkoxy or halo; and $R_2$ is benzoyl, halo-substituted benzoyl, di($C_1$–$C_4$)alkylamino($C_1$–$C_4$)alkyl, 2-thiophenecarbonyl, hydrogen or $C_1$–$C_4$ alkyl.

The term "$C_1$–$C_4$ alkyl" refers to straight and branched chain alkyls and includes methyl, ethyl, n-propyl, iso-propyl, n-butyl, sec-butyl and tert-butyl.

The term "$C_1$–$C_4$ alkoxy" includes methoxy, ethoxy, propoxy and butoxy.

The term "halo" as used herein includes chloro, fluoro, bromo and iodo.

The compounds of this invention are useful as anti-inflammatory and anti-pyretic agents when administered to mammalian patients in dosages of from 10 to 50 mg./kg. of body weight daily, preferably in divided dosages (i.e., 175 to 875 mg. four times daily). The anti-inflammatory activity of the compounds was established in the carrageenin rat paw edema test (Winter et al., *Proc. Soc. Exp. Biol. Med.* 111, 554 [1962]).

The anti-pyretic activity was established by the yeast-induced fever test in rats.

The preferred method of preparing the compounds of this invention is represented by the following reaction scheme:

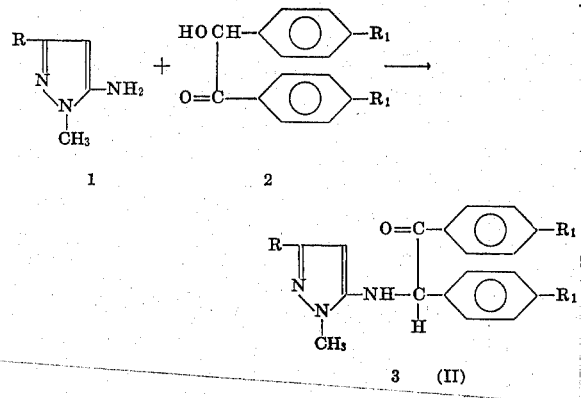

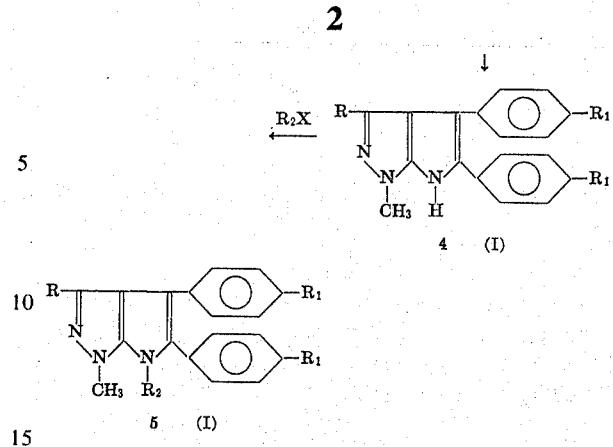

Compounds of the formula II

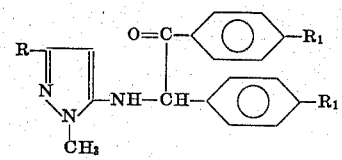

wherein R and $R_1$ is as defined herein above are novel compounds which are useful as intermediates in the synthesis of the final products I (4 and 5).

The following examples further illustrate the present invention:

EXAMPLE 1

5-[α-(p-Methoxybenzoyl)-p-Methoxybenzylamino]-1,3-Dimethyl-Pyrazole Hydrochloride A solution of p-anisoin (27.2 g., 0.10 mole), 1,3-dimethyl-5-aminopyrazole (12.2 g., 0.11 mole) and p-toluene-sulfonic acid monohydrate (0.95 g., 0.005 mole) in benzene (100 ml.) was refluxed under nitrogen atmosphere for 48 hours using a Barrett trap to collect the water formed (1 ml.). The reaction mixture was filtered and the filtrate was evaporated to dryness to yield an oil (37.8 g.). A part of this oil was dissolved in alcohol and treated with ethanolic picric acid. The picrate melted at 168°–169°.

Analysis
Calcd. for $C_{27}H_{26}N_6O_{10}$: C, 54.54; H, 4.41; N, 14.14; O, 26.92
Found: C, 54.58; H, 4.50; N, 14.20; O, 26.67

The picrate was dissolved in methanol and treated with amberlite IRA 400 resin the OH form (previously washed with methanol). The resin was filtered and the filtrate was evaporated to dryness. The oily residue was dissolved in ether and anhydrous hydrogen chloride was bubbled through the solution to give the hydrochloride salt, m.p. 230°–32° (from alcohol).

Analysis
Calcd. for $C_{21}H_{24}ClN_3O_3$: C, 62.76; H, 6.02; N, 10.46
Found: C, 62.61; H, 6.06; N, 10.60

EXAMPLE 2

5-[α-(p-Chlorobenzoyl)-p-Chlorobenzylamino]1,3-Dimethylpyrazole

A solution of 4,4'-dichlorbenzoin (16.9 g., 0.06 mole), 1,3-dimethyl-5-aminopyrazole (7.3 g., 0.066 mole) and p-toluenesulfonic acid monohydrate (0.57 g., 0.003 mole) in 80 ml. of benzene was refluxed for 12 hours under nitrogen atmosphere. The picrate was formed and converted to the free base as described in Example 1, to yield 7.6 g. of product, m.p. 140°–142° (from alcohol).

Analysis
Calcd. for $C_{19}H_{17}Cl_2N_3O$: C, 60.97; H, 4.58; N, 11.23
Found: C, 60.81; H, 4.01; N, 11.29

EXAMPLE 3

5-[α-(p-Methylbenzoyl)-p-Methylbenzylamino]-1,3-Dimethylpyrazole Hydrochloride

A solution of 4,4'-dimethylbenzoin (14.4 g., 0.060 mole), 1,3-dimethyl-5-aminopyrazole (7.3 g., 0.066 mole) and p-toluenesulfonic acid monohydrate (0.57 g., 0.003 mole) was refluxed in benzene (80 ml.) for 24 hours. The picrate was obtained as described in Example 1, m.p. 195°–197°.

Analysis
Calcd. for $C_{27}H_{26}N_6O_8$: C, 57.65; H, 4.66; N, 14.94
Found: C, 57.68; H, 4.65; N, 14.92

The picrate was converted to the free base and to the hydrochloride salt as described in Example 1, m.p. 223°–225°.

EXAMPLE 4

1,3-Dimethyl-4,5-di(p-Methoxyphenyl)-6H-Pyrrolo[2,3-c]Pyrazole

A stirred mixture of crude 5-[α-(p-methoxybenzoyl)-p-methoxybenzylamino]-1,3-dimethylpyrazole (7.3 g., 0.02 mole), aniline (5.59 g., 0.06 mole) and aniline hydrobromide (1.7 g., 0.01 mole) was heated at 170° for 3 hours. The reaction mixture was evaporated to dryness under vacuum to remove the excess aniline. The viscous residue was dissolved in 100 ml. of methanol and treated with 50 ml. of amberlite IRA-400 resin in the OH form (previously washed with methanol). The resin was removed by filtration. The filtrate was evaporated to dryness to yield an oil which was treated with 200 ml. of ether. The insoluble pyrrolo[2,3-c]pyrazole was filtered. Yield 2.5 g. (35%) m.p. 230°–232°.

Analysis
Calcd. for $C_{21}H_{21}N_3O_2$: C, 72.60; H, 6.09; N, 12.10; O, 9.21
Found: C, 72.42; H, 6.14; N, 12.04; O, 9.03

EXAMPLE 5

1,3-Dimethyl-4,5-di-(p-chlorophenyl)-6H-pyrrolo[2,3-c]pyrazole

A stirred mixture of crude 5-[α-(p-chlorobenzoyl)-p-chlorobenzylamino]-1,3-dimethylpyrazole (24.8 g., 0.066 mole), aniline (18.4 g., 0.198 mole) and aniline hydrobromide (5.7 g., 0.033 mole) was heated at 170° for 1½ hours. The reaction mixture was evaporated to dryness to yield an oil. Treatment with amberlite IRA-400 in the OH form, filtration and evaporation to dryness gave a residue which was treated with petroleum-ether (b.p. 90°–120°) (some tar remained insoluble). The petroleum-ether extracts were cooled and the solid formed was filtered. Yield 8.4 g. m.p. 190°–195° C. The crude solid was treated with water, filtered and crystallized from alcohol, m.p. 226°–228°.

Analysis
Calcd. for $C_{19}H_{15}Cl_2N_3$: C, 64.06; H, 4.24; N, 11.79
Found: C, 64.10; H, 4.33; N, 11.64

EXAMPLE 6

1,3-Dimethyl-4,5-di(p-tolyl)-6H-pyrrolo[2,3-c]pyrazole

A stirred mixture of crude 5-[α-(p-methylbenzoyl)-p-methyl-benzylamino]-1,3-dimethylpyrazole (19.4 g., 0.058 mole), aniline (16.2 g., 0.174 mole) and aniline hydrobromide (5.1 g., 0.029 mole) was heated at 170° for 3 hours. The product was isolated as described in Example 4. Yield 5.5 g., m.p. 238°–240° (from alcohol).

Analysis
Calcd. for $C_{21}H_{21}N_3$: C, 79.97; H, 6.71; O, 13.32
Found: C, 79.71; H, 6.77; O, 13.55

EXAMPLE 7

1,3-Dimethyl-4,5-diphenyl-6H-pyrrolo[2,3-c]pyrazole

A solution of benzoin (21.23 g., 0.10 mole), 1,3-dimethyl-5-aminopyrazole (12.2 g., 0.10 mole) and p-toluene-sulfonic acid monohydrate (0.95 g., 0.005 mole) in 150 ml. of benzene was refluxed for 14 hours under nitrogen atmosphere (1.6 ml. of water was collected). The reaction mixture was evaporated to dryness to yield an oil.

A part of the crude oil (12.22 g., 0.04 mole) was heated with aniline (11.8 g., 0.12 mole) and aniline hydrobromide (3.42 g., 0.02 mole) at 170° for 3 hours. The product was isolated as described in Example 4, except that the residual oil was dissolved in a minimum of alcohol and let stand. Yield 4.0 g., (35%), m.p. 130°, solidified and melted at 210°–211°.

Analysis
Calcd. for $C_{19}H_{17}N_3$: C, 79.41; H, 5.97; N, 14.62
Found: C, 79.35; H, 5.96; N, 14.44

EXAMPLE 8

1,3,6-Trimethyl-4,5-diphenylpyrrolo[2,3-c]pyrazole

To a stirred solution of 1,3-dimethyl-4,5-diphenyl-6H-pyrrolo[2,3-c]pyrazole (1.44 g., 0.005 mole) in 24 ml. of N,N-dimethylformamide was added sodium hydride (0.23 g., 0.005 mole). The reaction mixture was stirred for 1 hour at 25°. Methyl iodide (0.71 g., 0.005 mole) dissolved in 10 ml. of N,N-dimethylformamide was added dropwise. After the addition was over, the stirring was continued for 17 hours at room temperature. Evaporation of the solvent yielded a solid which was crystallized from alcohol, 0.6 g. (40%), m.p. 176°–177°.

Analysis
Calcd. for $C_{20}H_{19}N_3$: C, 79.70; H, 6.35; N, 13.94
Found: C, 79.62; H, 6.58; N, 13.74

EXAMPLE 9

1,3-Dimethyl-4,5-diphenyl-6-(p-chlorobenzoyl)-pyrrolo[2,3-c]pyrazole

The reaction of 1,3-dimethyl-4,5-diphenyl-6H-pyrrolo[2,3-c]pyrazole (1.44 g., 0.005 mole), sodium hydride (0.23 g., 0.005 mole) and p-chlorobenzoyl chloride (0.88 g., 0.005 mole) in N,N-dimethylformamide (20 ml.), as described in Example 8 yielded 1.5 g., (70%) of product, m.p. 168°–169°. The analytical sample melted at 170°–171°, (from alcohol).

Analysis
Calcd. for $C_{26}H_{20}ClN_3O$: C, 73.32; H, 4.73; N, 9.86
Found: C, 73.21; H, 4.67; N, 9.90

EXAMPLE 10

1,3,6-Trimethyl-4,5-di(p-methoxyphenyl)-pyrrolo[2,3-c]pyrazole

The reaction of 1,3-dimethyl-4,5-di(p-methoxyphenyl)-6H-pyrrolo[2,3-c]pyrazole (3.5 g., 0.01 mole), sodium hydride (0.46 g., 0.01 mole) and methyl iodide (1.4 g., 0.01 mole) in N,N-dimethylformamide, as described in Example 8, gave 2.7 g., (75%) of product, m.p. 179°–181°. The analytical sample melted at 180°–182° (from alcohol).

Analysis
Calcd. for $C_{22}H_{23}N_3O_2$: C, 73.11; H, 6.41; N, 11.63
Found: C, 72.89; H, 6.51; N, 11.73

EXAMPLE 11

1,3-Dimethyl-4,5-di(p-methoxyphenyl)-6-benzoyl-pyrrolo-[2,3-c]pyrazole

The reaction of 1,3-dimethyl-4,5-di(p-methoxyphenyl)-6H-pyrrolo[2,3-c]pyrazole (1.74 g., 0.005 mole), sodium hydride (0.23 g., 0.005 mole) and benzoyl chloride (0.71 g., 0.005 mole) in 20 ml. of N,N-dimethylformamide, as described in Example 8, yielded 1.5 g., (66%) m.p. 146°–150°. The analytical sample melted at 162°–163°.

Analysis
Calcd. for $C_{28}H_{25}N_3O_3$: C, 74.48; H, 5.58; N, 9.31; O, 10.63
Found: C, 74.28; H, 5.69; N, 9.24; O, 10.70

EXAMPLE 12

1,3-Dimethyl-4,5-di(p-methoxyphenyl)-6-(p-chlorobenzoyl)pyrrolo[2,3-c]pyrazole

The reaction of 1,3-dimethyl-4,5-di-(p-methoxyphenyl)-6H-pyrrolo[2,3-c]pyrazole (3.47 g., 0.01 mole), sodium hydride (0.46 g., 0.01 mole) and p-chlorobenzoyl chloride (1.75 g., 0.01 mole) in 30 ml. of N,N-dimethylformamide, as described in Example 8, gave 2.7 g. (56%) of product, m.p. 176°–178°. The analytical sample melted at 178°–179°.

Analysis
Calcd. for $C_{28}H_{24}ClN_3O_3$: C, 69.20; H, 4.98; Cl, 7.30; N, 8.65; O, 9.88
Found: C, 69.34; H, 4.98; Cl, 7.52 N, 8.82; O, 10.17

EXAMPLE 13

1,3,6-Trimethyl-4,5-di-(p-tolyl)pyrrolo[2,3-c]pyrazole

The reaction of 1,3-dimethyl-4,5-di-(p-tolyl)-6H-pyrrolo[2,3-c]pyrazole (1.6 g., 0.005 mole), sodium hydride (0.23 g., 0.005 mole) and methyl iodide (0.71 g., 0.005 mole) in 25 ml. of N,N-dimethylformamide as described in Example 8 yielded 0.7 g. (44%) of product, m.p. 182°–184°.

Analysis
Calcd. for $C_{22}H_{23}N_3$: C, 80.21; H, 7.04; N, 12.75
Found: C, 80.40; H, 7.18; N, 12.78

EXAMPLE 14

1,3-Dimethyl-4,5-di-(p-tolyl)-6-benzoylpyrrolo[2,3-c]pyrazole

The reaction of 1,3-dimethyl-4,5-di-(p-tolyl)-6H-pyrrolo[2,3-c]pyrazole (1.6 g., 0.005 mole), sodium hydride (0.23 g., 0.005 mole) and benzoyl chloride (0.71 g., 0.005 mole) in 25 ml. of N,N-dimethylformamide as described in Example 8 yielded 0.4 g. (19%) of product, m.p. 198°–200°.

Analysis
Calcd. for $C_{28}H_{25}N_3O$: C, 80.16; H, 6.01; N, 10.02
Found: C, 80.26; H, 6.16; N, 9.96

EXAMPLE 15

1,3-Dimethyl-4,5-di-(p-tolyl)-6-(p-chlorobenzoyl)-pyrrolo[2,3-c]pyrazole

The reaction in 1,3-dimethyl-4,5-di-(p-tolyl)-6H-pyrrolo[2,3-c]pyrazole (1.6 g., 0.005 mole), sodium hydride (0.23 g., 0.005 mole) and p-chlorobenzoyl chloride (0.88 g., 0.005 mole) in 25 ml. of N,N-dimethylformamide gave 0.04 g., of product (17%), m.p. 204°–206°.

Analysis
Calcd. for $C_{28}H_{24}ClN_3O$: C, 74.08; H, 5.33; N, 9.26
Found: C, 74.20; H, 5.42; N, 9.29

EXAMPLE 16

1,3,6-Trimethyl-4,5-di-(p-chlorophenyl)-pyrrolo[2,3-c]pryazole

The reaction of 1,3-dimethyl-4,5-di-(p-chlorophenyl)-6H-pyrrolo[2,3-c]pyrazole (1.4 g., 0.0039 mole), sodium hydride (0.18 g., 0.0039 mole) and methyl iodide (0.55 g., 0.0039 mole) in 20 ml. of N,N-dimethylformamide gave the product (0.7 g.) in 49% yield, m.p. 208°–210°.

Analysis
Calcd. for $C_{20}H_{17}Cl_2N_3$: C, 64.87; H, 4.63; N, 11.35
Found: C, 64.99; H, 4.68; N, 11.42

EXAMPLE 17

1,3-Dimethyl-4,5-di-(p-chlorophenyl)-6-benzoyl-pyrrolo[2,3-c]pyrazole

The reaction of 1,3-dimethyl-4,5-di-(p-chlorophenyl)-6H-pyrrolo[2,3-c]pyrazole (1.8 g., 0.005 mole), sodium hydride (0.23 g., 0.005 mole) and benzoyl chloride (0.71 g., 0.005 mole) in 25 ml. of N,N-dimethylformamide yielded 0.93 g. (40%) of the desired product, m.p. 188°–190°.

Analysis
Calcd. for $C_{26}H_{19}Cl_2N_3O$: C, 67.83; H, 4.16; N, 9.13
Found: C, 68.08; H, 4.24; N, 9.21

EXAMPLE 18

1,3-Dimethyl-4,5-di-(p-chlorophenyl)-6-(p-chlorobenzoyl)-pyrrolo[2,3-c]pyrazole

The reaction of 1,3-dimethyl-4,5-di-(p-chlorophenyl)-6H-pyrrolo[2,3-c]pyrazole (1.8 g., 0.005 mole), sodium hydride (0.23 g., 0.005 mole) and p-chlorobenzoyl chloride (0.88 g., 0.005 mole) in 25 ml. of N,N-dimethylformamide as described in Example 8 gave the expected product in 32% yield (0.8 g.), m.p. 186°–188°.

Analysis
Calcd. for $C_{26}H_{18}Cl_3N_3O$: C, 63.11; H, 3.67; N, 8.49
Found: C, 63.31; H, 3.72; N, 8.66

EXAMPLE 19

1,3-Dimethyl-4,5-di-(p-methoxyphenyl)-6-N,N-diethylaminoethyl pyrrolo[2,3-c]pyrazole To a stirred solution of 1,3-dimethyl-4,5-di-(p-methoxyphenyl)-6H-pyrrolo[2,3-c]pyrazole (3.5 g., 0.01 mole) in 25 ml. of N,N-dimethylformamide was added sodium hydride (0.46 g., 0.01 mole). The reaction mixture was stirred for 2 hours at 25°. Diethylaminoethyl chloride (1.4 g., 0.01 mole) dissolved in 25 ml. of N,N-dimethylformamide was added dropwise. After the addition was over, the stirring was continued for 20 hours at room temperature. Evaporation of the solvent yielded an oil. Extraction with (high boiling) petroleum-ether and evaporation of the petroleum-ether layer yielded a crude solid. Crystallization with petroleum-ether yielded 1.7 g. (37%) of product, m.p. 108°–110°.

Analysis
Calcd. for $C_{27}H_{34}N_4O_2$: C, 72.62; H, 7.67; N, 12.55
Found: C, 72.61; H, 7.87; N, 12.55

EXAMPLE 20

1,3-Dimethyl-4,5-di-(p-methoxyphenyl)-6-(2-thiophenecarbonyl)pyrrolo[2,3-c]pyrazole To a stirred solution of 1,3-dimethyl-4,5-di-(p-methoxyphenyl)-6H-pyrrolo[2,3-c]pyrazole (3.5 g., 0.01 mole) in 25 ml. of N,N-dimethylformamide was added sodium hydride (0.46 g., 0.01 mole). The reaction mixture was stirred overnight at room temperature. 2-Thiophenecarbonyl chloride (1.5 g., 0.01 mole) in 25 ml. of N,N-dimethylformamide was added dropwise. After the addition was over, the stirring was continued for 2 hours. Evaporation of the solvent yielded an oil. A solid (crude) formed when the oil was treated with dry ether. Crystallization of the solid with alcohol yielded 1.4 g. (31%) of product, m.p. 180°–182°.

Analysis
Calcd. for $C_{26}H_{23}N_3O_3S$: C, 68.25; H, 5.07; N, 9.18
Found: C, 68.41; H, 5.26; N, 9.32

EXAMPLE 21

1-Methyl-4,5-di(p-methoxyphenyl)-6H-pyrrolo[2,3-c]pyrazole

A solution of p-anisoin (29.95 g., 0.11 mole), 1-methyl-5-aminopyrazole (9.71 g., 0.10 mole) and p-toluene-sulfonic acid monohydrate (1.1 g., 0.0058 mole) in benzene (150 ml.) was refluxed under nitrogen atmosphere for 5 hours using a Barrett trap to collect the water formed. The reaction mixture was filtered and the filtrate was evaporated to dryness to yield an oil (32.5 g.). A part of this oil was dissolved in alcohol and treated with ethanolic picric acid. 5-[α-p-methoxybenzoyl)-p-methoxybenzylamino]-1-methylpyrazole picrate melted at 185°–186° turned red.

Analysis
Calcd. for $C_{26}H_{24}N_6O_{10}$: C, 53.79; H, 4.17; N, 14.48
Found: C, 54.07; H, 4.26; N, 14.65

The crude oil (37 g.) was treated with aniline (36.3 g., 0.39 mole) and aniline hydrobromide (10.4 g., 0.06 mole). The stirred reaction mixture was heated to 110° C. for 17 hours. The reaction mixture was cooled, dissolved in 500 ml. of methanol and then treated with 200 ml. of amberlite IRA-400 resin in the OH form (previously washed with methanol). The resin was filtered and the filtrate was concentrated to a samll volume to yield 15 g. of the product as a solid, m.p. 221°–223° (from methanol).

Analysis
Calcd. for $C_{20}H_{19}N_3O_2$: C, 72.05; H, 5.74; N, 12.60; O, 9.60
Found: C, 72.08; H, 5.85; N, 12.61; O, 9.97

The compounds of the present invention can be incorporated into various pharmaceutically acceptable dosage forms such as tablets, capsules, pills, suspensions and the like for immediate or sustained release, by combining them with suitable carriers or diluents according to methods well known in the art. In addition to the active agent and the pharmaceutically acceptable carrier or diluent, the dosage forms may additionally include various excipients, binders, fillers, lubricating agents, flavoring and sweetening agents and the like. However, in the case of, for example, filled capsules, the compound can be the sole ingredient.

We claim:

1. A method of treating inflammation in a mammalian patient comprising orally administering to said patient a therapeutically effective amount of a compound of the formula

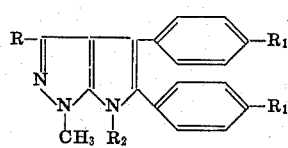

wherein R is hydrogen or methyl; $R_1$ is hydrogen, $C_1-C_4$ alkyl, $C_1-C_4$ alkoxy or halo; and $R_2$ is benzoyl, halo-substituted benzoyl, di($C_1-C_4$) alkylamino($C_1-C_4$)alkyl, 2-thiophenecarbonyl, hydrogen or $C_1-C_4$ alkyl.

2. The method of claim 1 wherein said compound is administered to said patient in dosages of 1–50 mg./kg. of body weight daily.

3. The method of claim 1 wherein $R_2$ is hydrogen and $R_1$ is $C_1-C_4$ alkoxy.

4. The method of claim 1 wherein said compound is: 1,3-dimethyl-4,5-di-(p-methoxyphenyl)-6H-pyrrolo[2,3-c]-pyrazole.

5. The method of claim 1 wherein said compound is 1,3-dimethyl-4,5-di-(p-chlorophenyl)-6H-pyrrolo[2,3-c]pyrazole.

6. The method of claim 1 wherein said compound is: 1,3-dimethyl-4,5-di-(p-tolyl)-6H-pyrrolo[2,3-c]pyrazole.

7. The method of claim 1 wherein said compound is: 1,3-dimethyl-4,5-diphenyl-6H-pyrrolo[2,3-c]pyrazole.

8. The method of claim 1 wherein said compound is: 1,3,6-trimethyl-4,5-diphenylpyrrolo[2,3-c]pyrazole.

9. The method of claim 1 wherein said compound is: 1,3,6-trimethyl-4,5-di(p-methoxyphenyl)-pyrrolo[2,3-c]pyrazole.

10. The method of claim 1 wherein said compound is: 1,3,6-trimethyl-4,5-di-(p-tolyl)-pyrrolo[2,3-c]pyrazole.

11. The method of claim 1 wherein said compound is: 1,3,6-trimethyl-4,5-di-(p-chlorophenyl)-pyrrolo[2,3-c]pyrazole.

12. The method of claim 1 wherein said compound is: 1,3-dimethyl-4,5-di(p-methoxyphenyl)-6-N,N-diethylaminoethyl-pyrrolo[2,3-c]pyrazole.

13. The method of claim 1 wherein said compound is: 1-methyl-4,5-di(p-methoxyphenyl)-6H-pyrrolo[2,3-c]pyrazole.

* * * * *